United States Patent [19]

Saito

[11] Patent Number: 4,761,824

[45] Date of Patent: Aug. 2, 1988

[54] BATTERY-POWERED MOBILE COMMUNICATIONS APPARATUS HAVING TRANSMITTER RESET FUNCTION

[75] Inventor: Akio Saito, Tokyo, Japan

[73] Assignee: NEC Corporation, Tokyo, Japan

[21] Appl. No.: 866,019

[22] Filed: May 22, 1986

[30] Foreign Application Priority Data

May 23, 1985 [JP] Japan ................... 60-110732

[51] Int. Cl.$^4$ ..................... H01Q 11/12; H04B 11/04
[52] U.S. Cl. .................... 455/127; 455/117; 340/663
[58] Field of Search .............. 455/115, 117, 127, 73, 455/89; 340/663, 636

[56] References Cited

U.S. PATENT DOCUMENTS

| | | | |
|---|---|---|---|
| 3,670,246 | 6/1972 | Gately | 340/663 |
| 3,911,360 | 10/1975 | Kimzey | 340/663 |
| 3,969,635 | 7/1976 | Wilke | 340/663 |
| 4,356,481 | 10/1982 | Kuki | 455/127 |
| 4,367,423 | 1/1983 | Hornung | 340/663 |
| 4,521,912 | 6/1985 | Franke et al. | 455/115 |
| 4,709,404 | 11/1987 | Tamura | 455/127 |

Primary Examiner—Robert L. Griffin
Assistant Examiner—Curtis Kuntz
Attorney, Agent, or Firm—Sughrue, Mion, Zinn, Macpeak and Seas

[57] ABSTRACT

A battery-powered mobile communications unit for reception and transmission of signals in which the continued transmitter operation, following activation, is controlled in response to accurate detection of battery deterioration. The battery voltage is monitored by a reset circuit to detect any voltage drop that exceeds a predetermined threshold and a command unit responds to the reset circuit to turn the transmitter off as long as the battery voltage is below threshold and to turn the transmitter on when the battery voltage rises above threshold. The duration of the voltage drop is also measured to determine if the drop is instantaneous, due to interferences or extended due to a battery deterioration. If extended, the command unit will not turn the transmitter on, even though the reset circuit indicates a rise in battery voltage above threshold.

13 Claims, 4 Drawing Sheets

FIG.1
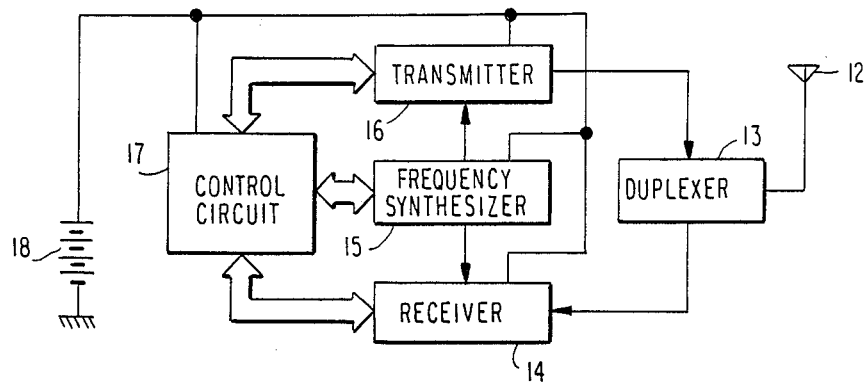
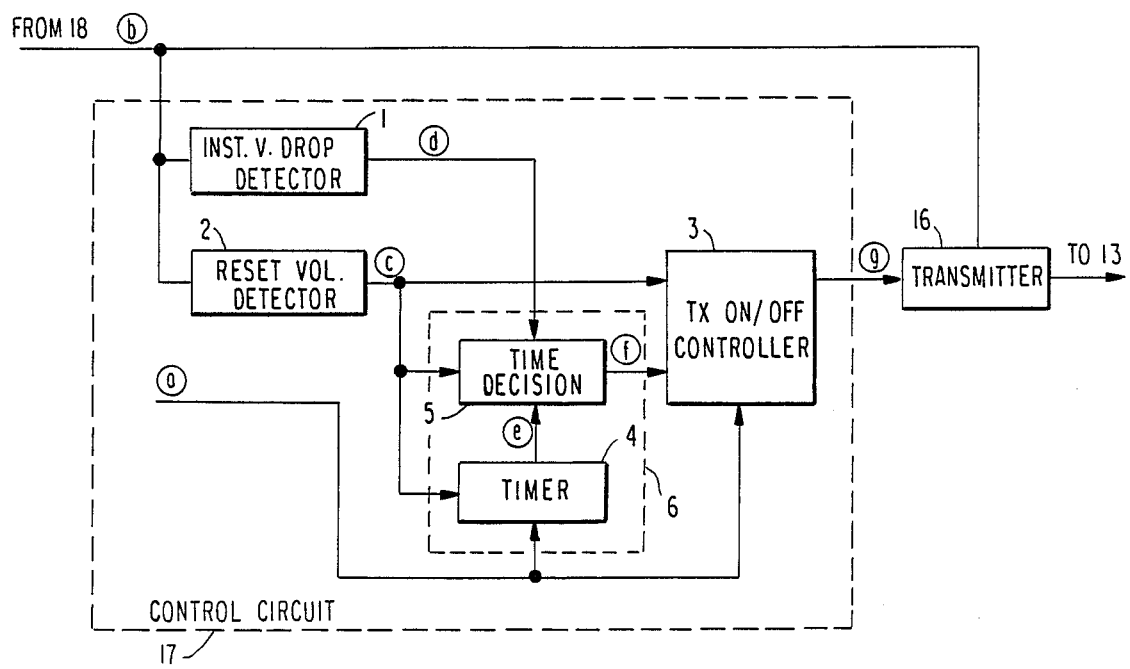
FIG.2

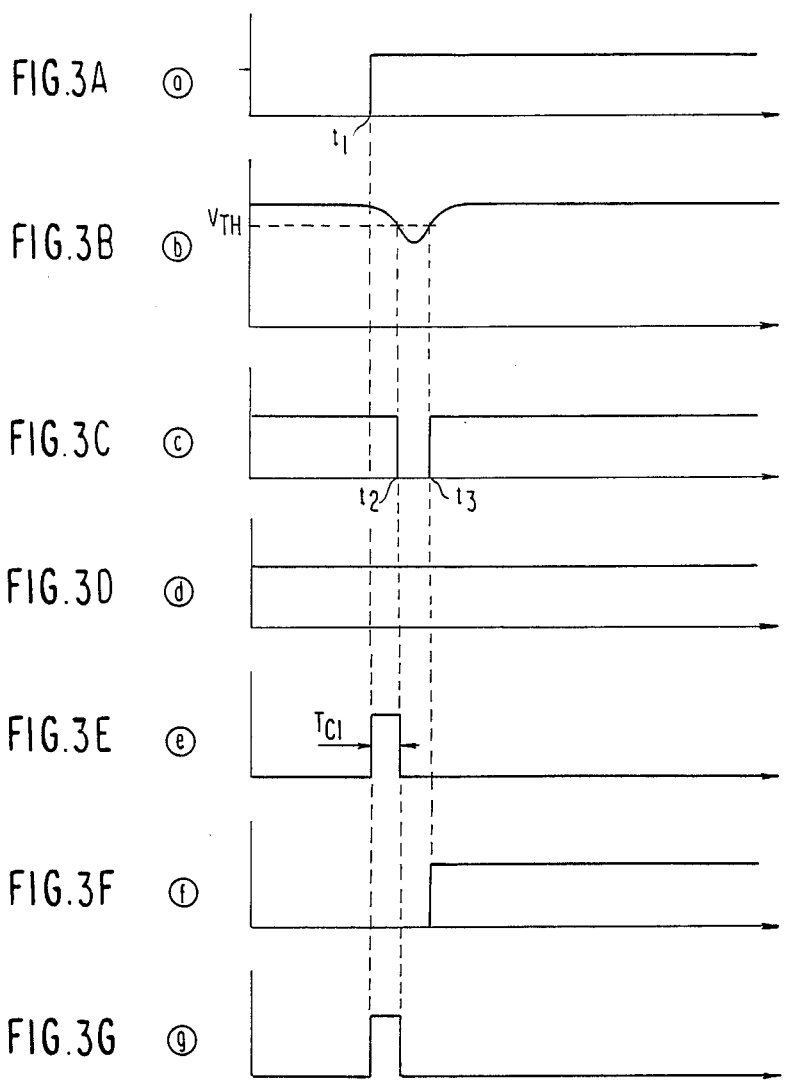
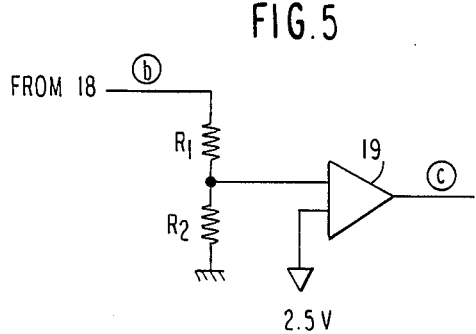
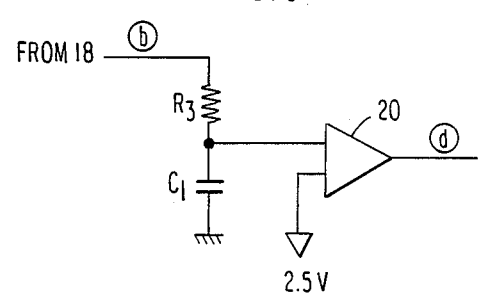

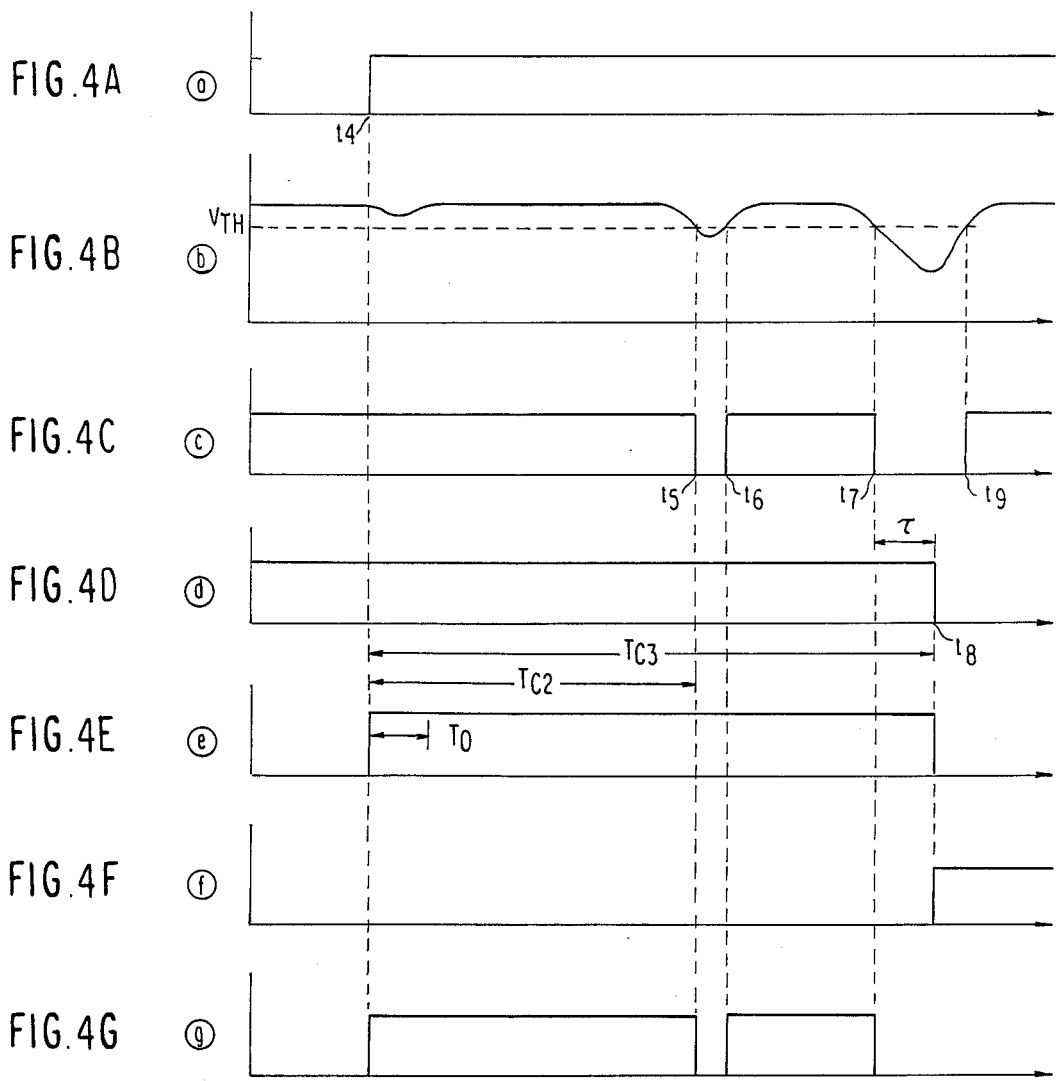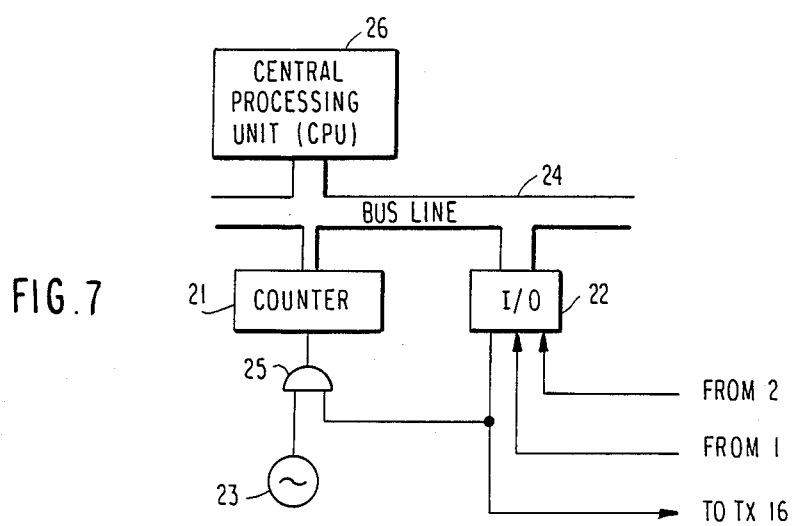

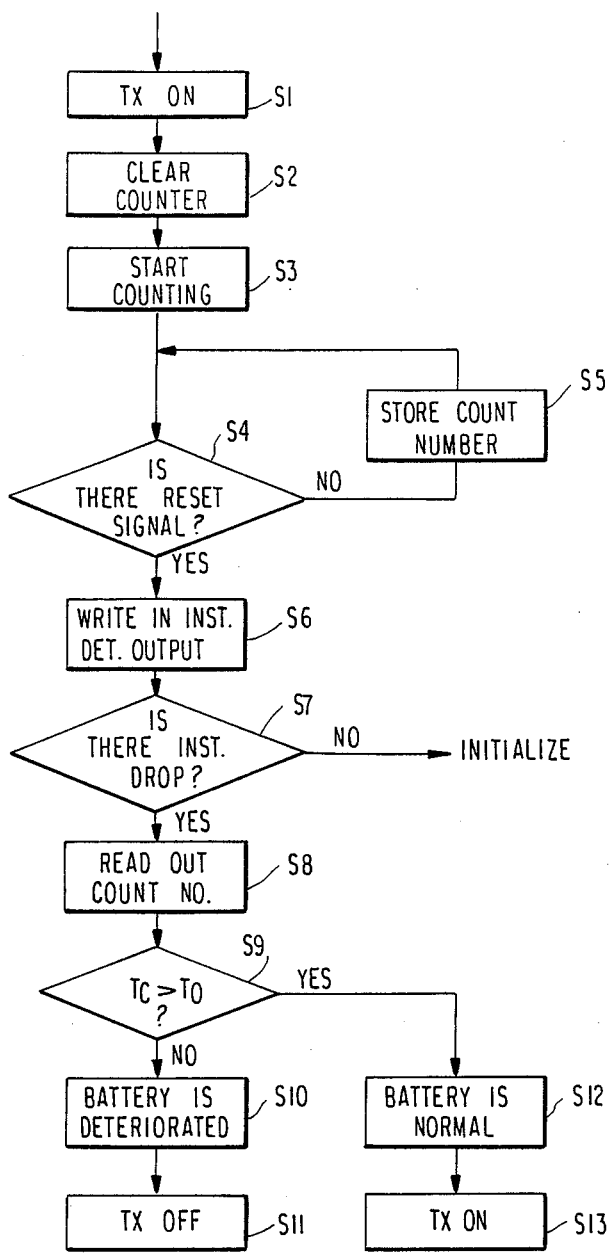

BATTERY-POWERED MOBILE COMMUNICATIONS APPARATUS HAVING TRANSMITTER RESET FUNCTION

BACKGROUND OF THE INVENTION

The present invention relates to a battery-powdered mobile communications apparatus and, more particularly, to a battery-powered mobile communications apparatus having a function to reset its transmitter when the output of the battery falls below a prescribed level.

Mobile communications apparatuses, particularly battery-powered ones, have a transmitter reset function because, when the battery output falls below a prescribed level, the transmitter is susceptible to such abnormalities as output interruption or radiation of radio waves at unlicensed frequencies. This reset function monitors the output level of the battery, and turns off the transmitter when the output falls below the prescribed level.

Since the transmitter consumes much power, as the battery deteriorates, its output level steeply falls off transiently when the transmitter is turned on, and the reset function is actuated to turn off the transmitter. But, once the transmitter is turned off, the output level of the battery is restored relatively quickly. This restoration releases the reset function, and further an instantaneous drop detector circuit in the apparatus judges the transient fall of the battery's output level as an instantaneous drop. The transmitter is again turned on in response to the release of the reset function and to the judgement of instantaneous drop detector circuit.

The reactuation of the transmitter invites a steep fall of the battery's output level again, and the aforementioned process is repeated. As a result, the transmitter is turned on and off repeatedly, making normal communication impossible.

SUMMARY OF THE INVENTION

An object of the present invention, therefore, is to provide a battery-powered mobile communications apparatus having a reset function so that its transmitter can normally operate even when its battery has deteriorated.

Another object of the invention is to provide a battery-powered mobile communications apparatus free from the undesirable repetition of the transmitter's turning on and off when the battery has deteriorated.

Still another object of the invention is to provide a battery-powered mobile communications apparatus capable of distinguishing between an instantaneous voltage drop occurring from the deterioration of the battery while the transmitter is on and any other instantaneous voltage drop, and thereby preventing faulty functioning when the battery has deteriorated.

According to the invention, there is provided a mobile communications apparatus comprising: a load circuit to which a DC voltage is supplied from a DC power source; reset voltage detector means for generating a reset signal for turning off the load circuit when the DC voltage falls below a predetermined level and a reset release signal for turning on the load circuit when the DC voltage returns to or above the predetermined level; means for detecting whether or not a change in the DC voltage is an instantaneous drop; means for measuring the lapse of time from the actuation of the load circuit until the generation of the reset signal; and means for comparing, when the instantaneous drop detector means has determined the change to be an instantaneous drop, the measured lapse of time with a predetermined length of time, and retaining the actuated state of the load circuit if the measured time is longer than the predetermined time, or turning off the load circuit if the former is shorter than the latter.

BRIEF DESCRIPTION OF THE DRAWINGS

The above and other objects, features and advantages of the present invention will become more apparent from the detailed description hereunder taken in conjunction with the accompanying drawings, wherein:

FIG. 1 is a block diagram of a mobile communications apparatus according to the invention;

FIG. 2 is a block diagram of the essential part of the logic circuit illustrated in FIG. 1;

FIGS. 3A to 3G and 4A to 4G are time charts for explaining the operation of the circuit shown in FIG. 2;

FIG. 5 is a schematic circuit diagram illustrating the reset voltage detector circuit shown in FIG. 2;

FIG. 6 is a schematic circuit diagram illustrating the instantaneous drop detector circuit shown in FIG. 2;

FIG. 7 is a block diagram illustrating another preferred embodiment of the mobile communications apparatus according to the invention; and FIG. 8 is a flow chart for explaining the operation of the apparatus shown in FIG. 7.

DETAILED DESCRIPTION OF THE PREFERRED EMBODIMENTS

Referring to FIG. 1, a mobile communications apparatus includes a transmitter 16 and a receiver 14. A synthesizer 15 supplies a local oscillation signal to the transmitter 16 and receiver 14, which are coupled to an antenna 12 through an antenna duplexer 13. The control of turning on and off the transmitter 16 and receiver 14, and that of the oscillation frequency of the synthesizer 15 are achieved by a control circuit 17. A dry battery 18 supplies DC voltage to the logic circuit 17, transmitter 16, receiver 14 and synthesizer 15.

The control circuit 17, monitoring the DC output of the battery 18, has a reset function to turn off the transmitter 16 when the DC output falls below a prescribed level. It also has a function to detect an instantaneous drop in the DC output level. The control circuit 17 further has a function to distinguish an instantaneous voltage drop caused by the deterioration of the battery from any other instantaneous voltage drop. This last mentioned function eliminates the undesirable repeated interruption of transmitted radio waves that may otherwise be caused by the battery deterioration.

Referring now to FIG. 2, a DC voltage b from the battery 18 is supplied to a reset voltage detector circuit 2 and an instantaneous drop detector circuit 1 as well as to the transmitter 16. In this state, the transmitter 16 is still in a standby state, but has not started transmission. When a transmitter "ON" signal a has been given, a transmitter ON/OFF controller circuit 3 outputs a control signal g to let the transmitter 16 start transmission unless there is any abnormality in the battery voltage. Meanwhile, if there is any abnormality in the battery voltage, for instance if the battery has deteriorated, the controller circuit 3 disables the transmitter 16 and prevents it from starting transmission with the control signal g. Determination of the presence or absence of an abnormality in the battery voltage is achieved by the reset voltage detector circuit 2, the instantaneous drop detector circuit 1 and a reset judging circuit 6.

The reset voltage detector 2, monitoring the battery voltage, outputs a reset signal when the voltage falls below a prescribed level, and a reset release signal c when it returns to the prescribed level or above. The instantaneous voltage drop detector circuit 1, also monitoring the battery voltage, checks the time duration during which the voltage falls below the prescribed level. Thus, the circuit 1, normally keeping its output d at a high level of "1", which does not vary even if an instantaneous voltage drop occurs, but its output d does change to a low level of "0" when the voltage remains below the prescribed level for more than a prescribed length of time. The circuit 1 thereby determines whether or not fluctuation in the battery voltage is an instantaneous drop. The reset judging circuit 6, comprising a timer circuit 4 and a time decision circuit 5, determines whether or not an instantaneous voltage drop is due to the deterioration of the battery.

Next will be described in detail the circuit illustrated in FIG. 2 with reference to FIGS. 3A to 3G and 4A to 4G. FIGS. 3A to 3G show how the circuit of FIG. 2 operates when the battery has deteriorated. When the transmitter "ON" signal a is supplied at time $t_1$ in FIG. 3A, the output g of the transmitter ON/OFF controller circuit 3 rises to its high level as shown in FIG. 3G, and the transmitter 16 is turned on. Once the transmitter is turned on, a large amperage is consumed (for instance from 600 to 800 mA), so that, if the battery of 6 or 7.2 V in voltage and 600 mAH in capacity is already deteriorated, its voltage b will quickly fall off (see FIG. 3B). When the voltage b falls below a prescribed level $V_{TH}$, the reset voltage detector circuit 2 changes its output from a high to low level at time $t_2$ as shown in FIG. 3C. Along with this change, the output g of the controller circuit 3 also changes to its low level to turn off the transmitter 16. The timer circuit 4 starts counting in response to the transmitter ON signal a, and discontinues counting in response to the reset signal c, as shown in FIG. 3E. The count $T_{C1}$ at this time is written into and stored in the time decision circuit 5 as an output e.

The battery voltage is quickly restored by the turning-off of the transmitter 16 as shown in FIG. 3B. When this restoration brings the battery voltage to or above the prescribed level $V_{TH}$, the reset voltage detector circuit 2 changes its output from a low to high level at time $t_3$ as shown in FIG. 3C, and supplies the output c as a reset release signal to the time decision circuit 5 and the transmitter ON/OFF controller circuit 3. In response to the reset release signal, the time decision circuit 5 compares the earlier stored count $T_{C1}$ with a prescribed length of time $T_0$. Since $T_0$ is greater than $T_{C1}$ in FIGS. 3A to 3G, the time decision circuit 5 attributes the reset from time $t_2$ to time $t_3$ to battery deterioration, and keeps the output at its high level as shown in FIG. 3F. Though the controller circuit 3 is going to reactuate the transmitter 16 with the reset release signal, since an output f indicating the deterioration of the battery has been received from the time decision circuit 5, the circuit 3 continues to keep the transmitter 16 off, as shown in FIG. 3G.

FIGS. 4A to 4G show how the circuit of FIG. 2 operates when the battery has not deteriorated. When the transmitter "ON" signal a rises to its high level at time $t_4$, the transmitter 16 is turned on, as shown in FIG. 3G, and at the same time the timer circuit 4 starts counting, as shown in FIG. 3E. When the battery has not deteriorated, even if the transmitter 16 is turned on, there will scarcely be a voltage drop as shown in FIG. 4B, and the battery voltage will not fall so far as to the prescribed level $V_{TH}$. Therefore, the output of the reset voltage detector circuit 1 (FIG. 4C) does not vary, and the timer circuit 4 continues counting. Accordingly the output g of the transmitter ON/OFF controller circuit 3 does not vary, so that the transmitter 16 remains ON.

If the battery voltage instantaneously drops for some reason or other as shown in FIG. 4B at time $t_5$, the output g of the controller circuit 3 will temporarily fall to its low level in response to the output c of the reset detector circuit 2. The output c also causes the timer circuit 4 to stop counting and to provide a count $T_{C2}$. When the output c returns to its high level at time $t_6$, the time decision circuit 5 compares the count $T_{C2}$ with the prescribed length of time $T_0$. Because $T_0$ is smaller than $T_{C2}$, the time decision circuit 5 judges the instantaneous drop between time $t_5$ and time $t_6$ as a simple instantaneous drop, and the output f remains at its low level. Since the output f is at its low level at time $t_6$ when the reset release signal is supplied, the transmitter ON/OFF controller circuit 3 brings back the output g to its high level, and turns the transmitter 16 on again.

In the manner described above, it is possible to determine whether a given instantaneous voltage drop is a simple one or attributable to the turning-on of the transmitter when the battery is deteriorated.

If the battery voltage remains at a low level for a relatively long period of time as from $t_7$ to $t_9$ in FIGS. 4A to 4G, and the instantaneous drop detector circuit 1 judges that continued fall not to be an instantaneous drop according to time $\tau$ (to be explained below), the transmitter 16 will be kept turned off even if the voltage returns to its normal level at time $t_9$.

FIG. 5 is a circuit diagram illustrating the reset voltage detector circuit 2. A voltage b from the battery 18 is divided by resistors R1 and R2, and the divided voltage is compared with a reference voltage (e.g., 2.5 V) by a comparator 19, which outputs the reset signal c when the battery voltage falls below 2.5 V.

FIG. 6 illustrates the instantaneous drop detector circuit 1. When the battery voltage b falls off, a capacitor C1 discharges at a time constant $\tau$ (=C1R3), and as the terminal voltage of the capacity C1 falls below the reference voltage (2.5 V), a comparator 20, judging the fall not to be an instantaneous drop, changes its output d from its high to low level. If the battery voltage drop is within $\tau$, the output d of the comparator 20 will not change.

Referring now to FIG. 7, a central processing unit (CPU) 26 has the functions of the transmitter ON/OFF controller circuit 3 and time decision circuit 5 of the first preferred embodiment illustrated in FIG. 2. A counter 21, corresponding to the timer circuit 4 in FIG. 2, counts clocks supplied from a clock generator 23 through an AND gate 25. An input/output (I/O) port 22 serves to connect external circuits to the CPU 26, which controls the turning on and off of the transmitter through a bus line 24 and the I/O port 22. A high level signal to turn on the transmitter is supplied to the AND gate 25 as well as to the transmitter from the I/O port 22.

Next will be described the operation of the apparatus illustrated in FIG. 7 with reference to FIG. 8. Referring to FIG. 8, when the CPU 26 generates a transmitter "ON" signal at Step S1, it clears the counter 21 at Step S2. The counter 21 starts counting in response to the transmitter "ON" signal (Step S3). At Step S4, the CPU 26 checks the output of the reset voltage detector circuit 2 (FIG. 2) and, in the absence of a reset output, stores the count of the counter 21 into a memory within the CPU 26 at Step S5, followed by a return to Step S4. In the presence of a reset output, the process moves ahead to Step S6 to read the output of the instantaneous drop detector circuit 1 (FIG. 2), and determines whether or not there is an instantaneous voltage drop at Step S7.

If it is determined at Step S7 that there is no instantaneous voltage drop, i.e., the voltage drop lasts longer than the period of time $\tau$, the CPU 26 will initialize the whole apparatus. Conversely, if the presence of an instantaneous voltage drop is detected, the count $T_C$ of the counter 21 will be read out of the memory at Step S8, and compared with the prescribed value $T_0$ at Step S9. If $T_C$ is found greater than $T_0$, the battery will be judged normal as at Step S12, and the transmitter will be kept turned on (Step S13). If $T_C$ is smaller than $T_0$, the battery will be judged at Step S10 to have deteriorated, and the process will move ahead to Step S11 to turn off the transmitter.

What is claimed is:

1. A mobile communications apparatus comprising:
a load circuit to which a DC voltage is supplied from a DC power source;
first detector means for generating a reset signal for turning off said load circuit when said DC voltage falls below a predetermined level and a reset release signal for turning on said load circuit when said DC voltage returns to or above said predetermined level;
second detector means for detecting whether or not a change in said DC voltage is an instantaneous drop;
actuating means for providing an actuation signal in order to place said load means in an actuated state;
timer means connected to detect said actuation signal and said reset signal for measuring the lapse of time from the actuation of said load circuit until the generation of said reset signal; and
means responsive to the outputs of said first and second detector means and said timer means and to said actuation signal for comparing, when said second detector means has determined said change to be an instantaneous drop, the measured lapse of time with a predetermined length of time, and for terminating the actuated state of said load circuit if the measured time is shorter than said predetermined time.

2. A mobile communications apparatus as claimed in claim 1 wherein said DC power source comprises a dry battery.

3. A mobile communications apparatus as claimed in claim 1 wherein said load circuit comprises a transmitter.

4. A mobile communications apparatus as claimed in claim 1, wherein said first detector means comprises means for dividing said DC voltage and a voltage comparator for comparing the divided voltage with a reference voltage and supplying the result of said comparison as the output of said first detector means.

5. A mobile communications apparatus as claimed in claim 1, wherein said second detector means comprises an integrator circuit coupled to said DC power source and a voltage comparator for comparing the output of said integrator circuit with a reference voltage and supplying the result of comparison as the output of said second detector means.

6. A mobile communications apparatus as claimed in claim 5, wherein said integrator circuit comprises a resistor connected between said DC power source and said voltage comparator; and a capacitor connected between a common voltage point and the connection point of said resistor and said voltage comparator.

7. A method to detect the deterioration of a DC power source, comprising the following steps:
supplying a DC voltage from said DC power source to a load circuit;
continuously comparing said DC voltage with a predetermined level of voltage;
providing a reset signal when said DC voltage falls below said predetermined level and a reset release signal when said DC voltage returns to or above said predetermined level;
determining whether or not a change in said DC voltage is an instantaneous drop;
placing said load circuit into an actuated state with an actuation signal;
measuring the lapse of time from the actuation of said load circuit until the generation of said reset signal;
comparing, when said change in DC voltage has been determined to be an instantaneous drop, the measured lapse of time with a predetermined length of time;
retaining the actuated state of said load circuit if said measured time is longer than said predetermined time; and
turning off said load circuit if said measured time is shorter than said predetermined time.

8. A mobile communications apparatus comprising:
transmitter means receiving a supply of power from a battery;
first detector means for comparing the output voltage of said battery with a predetermined level of voltage and providing a reset signal when said output voltage falls below said predetermined level and a reset release signal when said output voltage returns to or above said predetermined level;
second detector means for detecting whether or not a drop in said output voltage is an instantaneous drop;
counter means which starts counting clock pulses begins a timed count in response to a signal for actuating said transmitter; and
a central processing unit connected to said transmitter, first and second detector, and counter means:
for providing said signal for actuating said transmitter; for comparing, when said second detector means has determined a drop in said output voltage to be an instantaneous drop, the count of said counter with a prescribed value in response to said reset signal; for keeping said transmitter turned on if said count is equal to or greater than said prescribed value; and for turning off said transmitter if the former is smaller than the latter.

9. A mobile communications apparatus as claimed in claim 8 wherein said first detector means comprises means for dividing the output voltage of said battery and a voltage comparator for comparing the divided voltage with a reference voltage and supplying the result of comparison as the output of said reset voltage detector means.

10. A mobile communications apparatus as claimed in claim 8 wherein said second detector means comprises an integrator circuit coupled to the output voltage of said battery and a voltage comparator for comparing the output of said integrator circuit with a reference voltage and supplying the result of comparison as the output of said second detector means.

11. A mobile communications apparatus as claimed in claim 8, wherein said integrator circuit comprises a resistor connected between said battery and said voltage comparator; and a capacitor connected between a common voltage point and the connection point of said resistor and said voltage comparator.

12. A method to detect the deterioration of a battery for supplying a DC voltage to a mobile communications apparatus, comprising the following steps:

turning on a transmitter;

clearing and starting a counter for determining a duration of time in response to turning on the transmitter;

determining whether or not the output voltage of said battery has reached a predetermined voltage;

storing the count of said counter in a memory if said output voltage has not reached said predetermined voltage;

determining whether or not a fall in said output voltage is an instantaneous drop if said output voltage has reached said predetermined voltage;

initializing said mobile communications apparatus if the fall in said output voltage is not an instantaneous drop;

comparing said duration of time with a predetermined value if the fall in said output voltage is an instantaneous drop; and judging that said battery is normal if said duration of time exceeds said predetermined value and that said battery is deteriorated if the former does not exceed the latter.

13. A method as claimed in claim 12 further comprising the following steps;

keeping said transmitter turned on if said battery is judged to be normal; and turning off said transmitter if said battery is judged to be deteriorated.

* * * * *